US012665618B2

(12) United States Patent
Zhou et al.

(10) Patent No.: US 12,665,618 B2
(45) Date of Patent: Jun. 23, 2026

(54) ELECTRONIC DEVICE, ANTENNA CONTROL METHOD AND COMMUNICATION CHIP

(71) Applicant: REALTEK SEMICONDUCTOR CORPORATION, Hsinchu (TW)

(72) Inventors: Jian-Jun Zhou, Suzhou (TW); Jie-Hong Yu, Suzhou (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 454 days.

(21) Appl. No.: 18/202,020

(22) Filed: May 25, 2023

(65) Prior Publication Data

US 2023/0421182 A1      Dec. 28, 2023

(30) Foreign Application Priority Data

Jun. 27, 2022     (CN) .......................... 202210734145.9

(51) Int. Cl.
*H04B 1/00*          (2006.01)
*H04W 72/0446*     (2023.01)

(52) U.S. Cl.
CPC ........ *H04B 1/006* (2013.01); *H04W 72/0446* (2013.01)

(58) Field of Classification Search
CPC .... H04B 1/006; H04B 1/401; H04W 72/0446
See application file for complete search history.

(56) References Cited

U.S. PATENT DOCUMENTS

| 11,039,457 B2 | 6/2021 | Kencharla |
| 2007/0197256 A1 | 8/2007 | Lu |

| 2009/0137206 A1* | 5/2009 | Sherman | ............... H04W 16/14 |
| | | | 455/41.2 |
| 2009/0285167 A1 | 11/2009 | Hirsch | |
| 2010/0008338 A1 | 1/2010 | Tsfati | |
| 2012/0329395 A1 | 12/2012 | Husted | |
| 2023/0238994 A1* | 7/2023 | Lin | ...................... H04B 1/0078 |
| | | | 455/552.1 |

FOREIGN PATENT DOCUMENTS

| CN | 112335314 A | 2/2021 |
| TW | 202226878 A | 7/2022 |

OTHER PUBLICATIONS

OA letter of (U.S. Appl. No. 18/201,997) mailed on Sep. 24, 2025.

* cited by examiner

*Primary Examiner* — Ayodeji O Ayotunde

(74) *Attorney, Agent, or Firm* — WPAT, PC

(57) ABSTRACT

An electronic device, an antenna control method, and a communication chip are provided. The electronic device includes an antenna, a line switching circuit, a first communication chip, and a second communication chip. The line switching circuit is coupled to the antenna. The first communication chip is coupled to the antenna through the line switching circuit and configured to generate a slot allocation signal. The second communication chip is coupled to the antenna through the line switching circuit and configured to generate a packet distribution signal. The first communication chip and the second communication chip are communication chips of different types. The line switching circuit switches the antenna to the first communication chip or the second communication chip according to the packet distribution signal.

16 Claims, 10 Drawing Sheets

S1010 — electrically connecting the antenna to the first communication chip rather than the second communication chip when the packet distribution signal is at the first level S1020 — electrically connecting the antenna to the second communication chip rather than the first communication chip when the packet distribution signal is at the second level

ELECTRONIC DEVICE, ANTENNA CONTROL METHOD AND COMMUNICATION CHIP

BACKGROUND OF THE INVENTION

1. Field of the Invention

The present invention generally relates to antenna sharing among multiple wireless communication protocols.

2. Description of Related Art

In recent years, the update and emergence of new generations of various wireless communication protocols are fast, which continuously drives the progress of technology and updates of products, contributing to rapid growth of the Internet of Things (IoT) industry. Due to the limitation of volume and consideration of product cost, most of the wireless communication products use a single antenna for the operations of multiple wireless communication protocols. For example, smart watches or bands involve two communication protocols: wireless local area network (WLAN) and Bluetooth; smart gateways involve two communication protocols: Thread and Bluetooth or Zigbee and Bluetooth.

Therefore, in IoT products that have only one antenna, it is crucial to control the antenna in a way that ensures multiple wireless communication protocols to function properly.

SUMMARY OF THE INVENTION

In view of the issues of the prior art, an object of the present invention is to provide an electronic device, an antenna control method, and a communication chip, so as to make an improvement to the prior art.

According to one aspect of the present invention, an electronic device is provided. The electronic device includes an antenna, a line switching circuit, a first communication chip, and a second communication chip. The line switching circuit is coupled to the antenna. The first communication chip is coupled to the antenna through the line switching circuit and configured to generate a slot allocation signal. The second communication chip is coupled to the antenna through the line switching circuit and configured to generate a packet distribution signal. The first communication chip and the second communication chip are communication chips of different types. The line switching circuit switches the antenna to the first communication chip or the second communication chip according to the packet distribution signal.

According to another aspect of the present invention, an antenna control method of switching an antenna to a first communication chip or a second communication chip is provided. The first communication chip and the second communication chip are communication chips of different types. The first communication chip outputs a slot allocation signal to the second communication chip. The second communication chip outputs a packet distribution signal. The method includes the following steps: electrically connecting the antenna to the first communication chip and not electrically connected the antenna to the second communication chip when the packet distribution signal is at a first level; and electrically connecting the antenna to the second communication chip and not electrically connected the antenna to the first communication chip when the packet distribution signal is at a second level that is different from the first level.

According to still another aspect of the present invention, a communication chip is provided. The communication chip shares an antenna with a target communication chip. One of the communication chip and the target communication chip switches the antenna to the communication chip when a packet distribution signal is at a first level, so that the communication chip can use the antenna and the target communication chip cannot use the antenna. One of the communication chip and the target communication chip switches the antenna to the target communication chip when the packet distribution signal is at a second level, so that the target communication chip can use the antenna and the communication chip cannot use the antenna. The first level is different from the second level. The communication chip and the target communication chip are communication chips of different types.

The technical means embodied in the embodiments of the present invention can solve at least one of the problems of the prior art. Therefore, compared with the prior art, the present invention can properly control the antenna so that various wireless communication protocols can function as expected.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an electronic device, an antenna control method, and a communication chip. On account of that some or all elements of the electronic device could be known, the detail of such elements is omitted provided that such detail has little to do with the features of this disclosure, and that this omission nowhere dissatisfies the specification and enablement requirements. Some or all of the processes of the antenna control method may be implemented by software and/or firmware and can be performed by the electronic device, the communication chip, or their equivalents. A person having ordinary skill in the art can choose components or steps equivalent to those described in this specification to carry out the present invention, which means that the scope of this invention is not limited to the embodiments in the specification.

Figure 1:
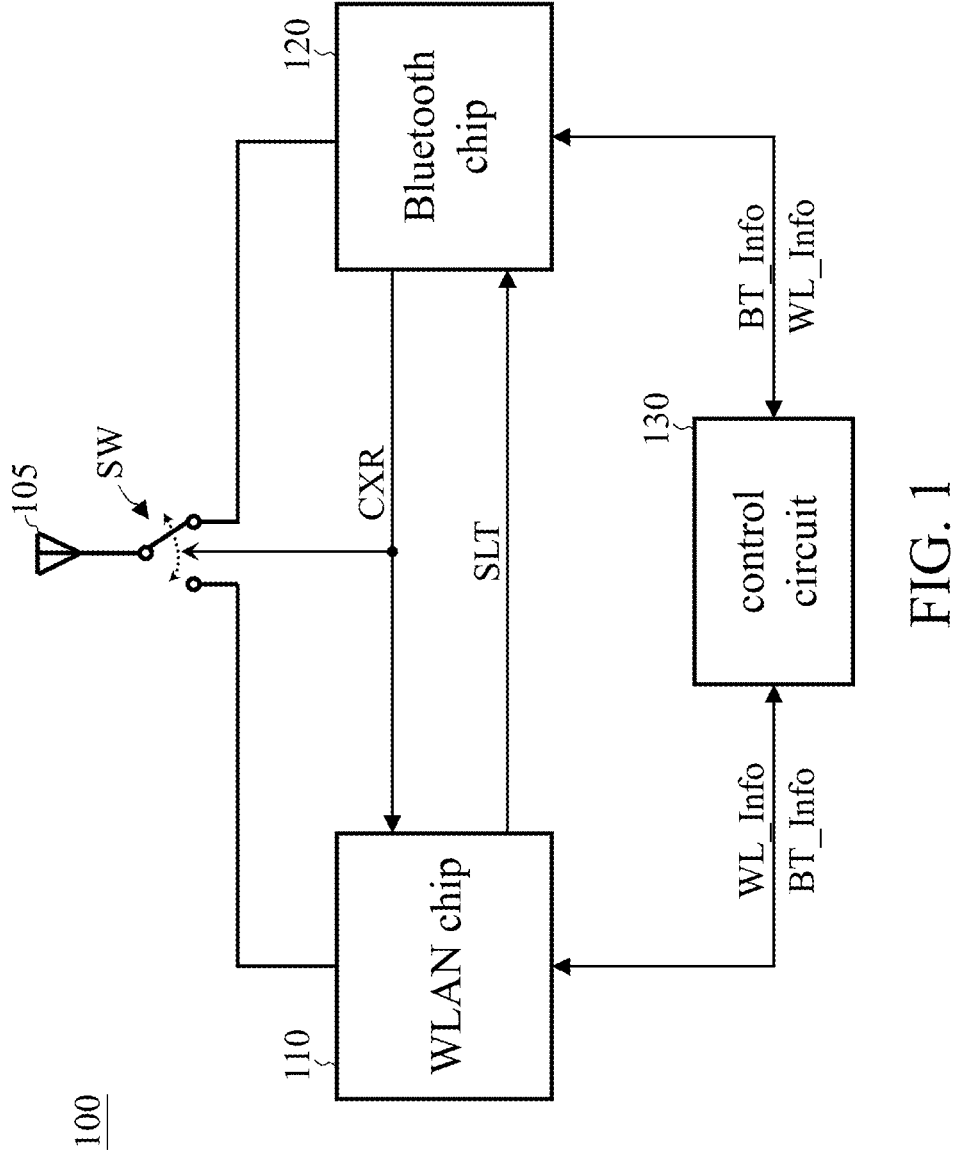
FIG. 1 is a functional block diagram of an electronic device according to an embodiment of the present invention.

FIG. 1 is a functional block diagram of an electronic device according to an embodiment of the present invention. The electronic device 100 includes an antenna 105, a line switching circuit SW, a WLAN chip 110, a Bluetooth chip 120, and a control circuit 130. The WLAN chip 110 outputs a slot allocation signal SLT to the Bluetooth chip 120. The Bluetooth chip 120 outputs a packet distribution signal CXR to the WLAN chip 110. The line switching circuit SW switches, according to the packet distribution signal CXR, the antenna 105 to the WLAN chip 110 (i.e., to electrically connect the antenna 105 to the WLAN chip 110 but not to the Bluetooth chip 120, so that the antenna 105 is used by the WLAN chip 110 instead) or to the Bluetooth chip 120 (i.e., to electrically connect the antenna 105 to the Bluetooth chip 120 but not to the WLAN chip 110, so that the antenna 105 is used by the Bluetooth chip 120). The WLAN chip 110 also operates according to the packet distribution signal CXR. The line switching circuit SW can be embodied by a switch, a multiplexer, or an equivalent thereof. However, it should be understood that although the line switching circuit SW in this embodiment seems to be embodied by a physical switch and disconnection circuit, in other embodiments, the electrical connection relationship that only one of the WLAN chip 110 and the Bluetooth chip 120 uses the antenna 105 at a given time can be implemented through other feasible manners.

The control circuit 130 receives the operation information of the WLAN chip 110 (i.e., the WLAN chip information WL_Info) from the WLAN chip 110, receives the operation information of the Bluetooth chip 120 (i.e., the Bluetooth chip information BT_Info) from the Bluetooth chip 120, and provide the WLAN chip information WL_Info and the Bluetooth chip information BT_Info to the Bluetooth chip 120 and the WLAN chip 110, respectively. Therefore, the WLAN chip 110 can operate according to the Bluetooth chip information BT_Info, and the Bluetooth chip 120 can operate according to the WLAN chip information WL_Info. The WLAN chip information WL_Info includes the current status of the WLAN chip 110, such as connected, disconnected, or scanning. The Bluetooth chip information BT_Info includes the current operating profile of the Bluetooth chip 120, such as the Advance Audio Distribution Profile (A2DP), or the Hands-Free Profile (HFP).

Figure 2:
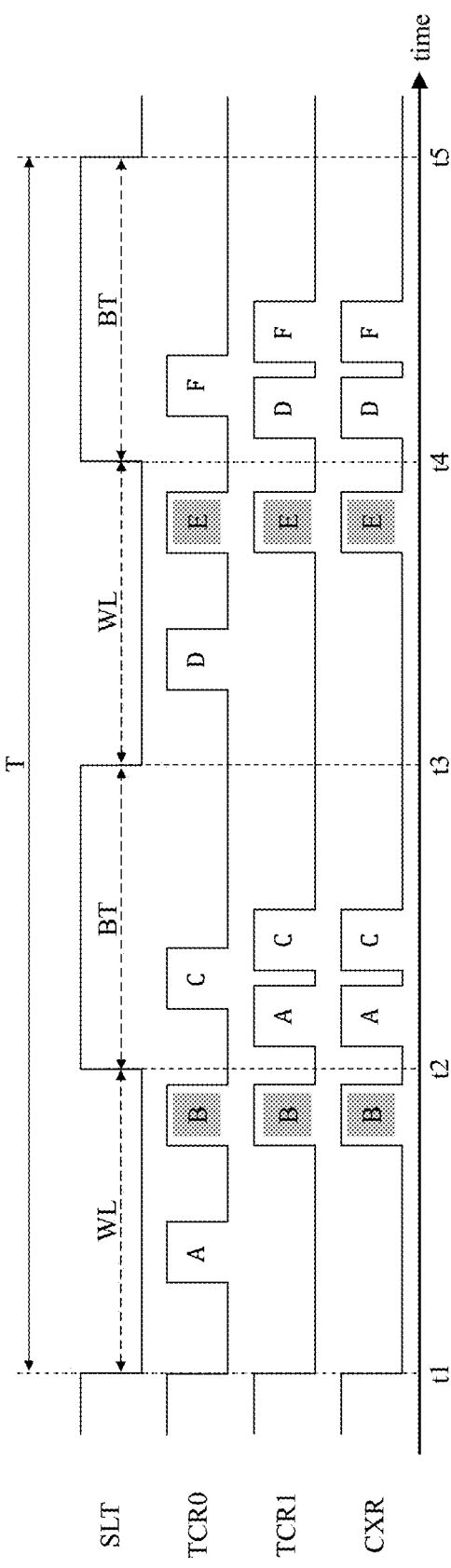
FIG. 2 is a timing diagram according to an embodiment of the present invention.

Reference is made to FIG. 2, which is a timing diagram according to an embodiment of the present invention. Within a period T, the slot allocation signal SLT includes four slots: the slot WL (which is between the time point t1 and the time point t2, and during which the slot allocation signal SLT is at a low level), the slot BT (which is between the time point t2 and the time point t3, and during which the slot allocation signal SLT is at a high level), the slot WL (which is between the time point t3 and the time point t4, and during which the slot allocation signal SLT is at the low level), and the slot BT (which is between the time point t4 and the time point t5, and during which the slot allocation signal SLT is at the high level). The slot WL and the slot BT appear alternately.

In some embodiments, a period T may contain more slots (e.g., 6, 8 or more) or fewer slots (e.g., 2, that is, one slot WL and one slot BT).

In some embodiments, the WLAN chip 110 generates the slot allocation signal SLT according to a time point at which the beacon is received. More specifically, the WLAN chip 110 generates an interrupt a short period of time (e.g., hundreds of microseconds) before a preset beacon reception time point, and the WLAN chip 110 pulls down the slot allocation signal SLT after the generation of the interrupt (for example at the time point t1, the time point t3, and the time point t5), and pulls up the slot allocation signal SLT after a predetermined period of time (for example, after the time length of t2‑t1 and t4‑t3). The predetermined period of time can be fixed (i.e., t2‑t1 and t4‑t3 are fixed values) or not fixed (i.e., t2‑t1 and t4‑t3 are not fixed values).

When the packet transceiving request signal TCR0 is at the high level, the Bluetooth chip 120 transmits or receives packets. In the example of FIG. 2, the Bluetooth chip 120 transmits or receives 6 packets in the period T: packet A, packet B, packet C, packet D, packet E, and packet F, with the packets A, B, D and E falling within the slot WL, while the packets C and F falling within the slot BT.

In some embodiments, packet B and packet E are periodic packets, such as packets related to Bluetooth Low Energy (BLE) or enhanced Synchronous Connection Oriented (eSCO). The Bluetooth chip 120 is required to transmit or receive the packets B and E at specific time points. In other words, the Bluetooth chip 120 cannot arbitrarily change the time points of transmitting or receiving the packets B and E. In some embodiments, packets B and E may be regarded as critical packets.

The rearranged packet transceiving request signal TCR1 is the result of redistributing or rearranging the packets. The Bluetooth chip 120 redistributes or rearranges the packets according to the slot allocation signal SLT, so that the packets A and D are moved from the slot WL to the slot BT. As a result, the Bluetooth chip 120 can transmit or receive packets A and D in the slot BT. In other words, the Bluetooth chip 120 learns the distributions of slots from the slot allocation signal SLT and arranges the packets that can be adjusted and arranged (i.e., packet A, packet C, packet D, and packet F) in the slot BT to effectively use the slot BT to transmit or receive as many packets as possible.

The packet distribution signal CXR is approximately the same as the rearranged packet transceiving request signal TCR1. When the packet distribution signal CXR is at low level, the antenna 105 is switched to the WLAN chip 110; when the packet distribution signal CXR is at the high level, the antenna 105 is switched to the Bluetooth chip 120. In other words, the antenna 105 is switched to the Bluetooth chip 120 only when the Bluetooth chip 120 needs to transmit or receive packets, and the antenna 105 is switched to the WLAN chip 110 at other times to achieve the purpose of sharing the antenna 105. From the packet distribution signal CXR, the WLAN chip 110 learns the time at which the antenna 105 is assigned to itself (i.e., the time when the packet distribution signal CXR is at the low level).

In some embodiments, the Bluetooth chip 120 uses a state machine, in cooperation with hardware, to implement packet adjustment and/or arrangement. In some other embodiments, the Bluetooth chip 120 uses software to implement packet adjustment and/or arrangement. In other words, there are many ways to implement packet adjustment and/or arrangement.

In some embodiments, when the Bluetooth chip 120 learns from the WLAN chip information WL_Info that the WLAN chip 110 is disconnected, the Bluetooth chip 120 can control the antenna 105 to be electrically connected to the Bluetooth chip 120 only, without taking the slot allocation signal SLT into account as well as redistributing or rearranging packets.

In some embodiments, the timing diagram in FIG. 2 correspond to the WLAN chip 110 being in the process of scanning or establishing a connection.

Figure 3:
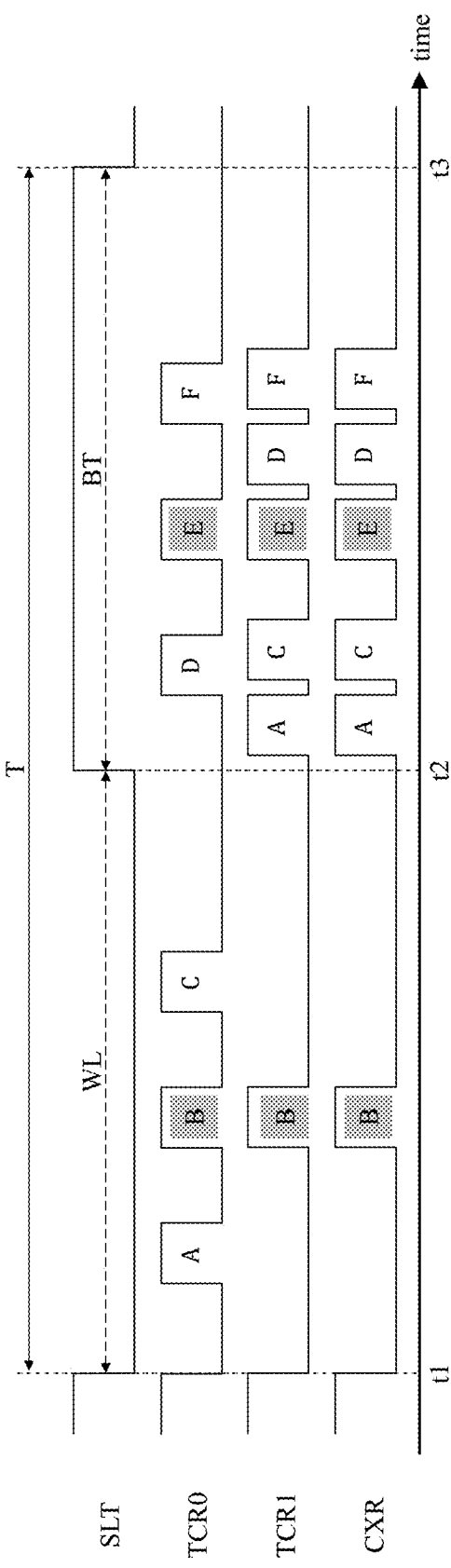
FIG. 3 is a timing diagram according to another embodiment of the present invention.

Reference is made to FIG. 3, which is a timing diagram according to another embodiment of the present invention. The timing diagram in FIG. 3 corresponds the Bluetooth chip 120 operating according to the A2DP. In the example of FIG. 3, a period T contains two slots; however, in other embodiments, a period T may contain more slots. When the packet distribution signal CXR is at the low level, the WLAN chip 110 uses the antenna; when the packet distribution signal CXR is at the high level, the Bluetooth chip 120 uses the antenna.

Similar to the embodiment of FIG. 2, the Bluetooth chip 120 moves packets A and C from the slot WL to the slot BT (i.e., the packet transceiving request signal TCR0 is changed to the rearranged packet transceiving request signal TCR1) by redistributing or rearranging the packets according to the slot allocation signal SLT. In this way, the Bluetooth chip 120 can transmit or receive packets A and C in the slot BT. In other words, in the embodiment of FIG. 3, the Bluetooth chip 120 learns the distributions of slots from the slot allocation signal SLT and arranges the packets that can be adjusted and arranged (i.e., packet A, packet C, packet D, and packet F) in the slot BT to effectively use the slot BT to transmit or receive as many packets as possible.

Figure 4:
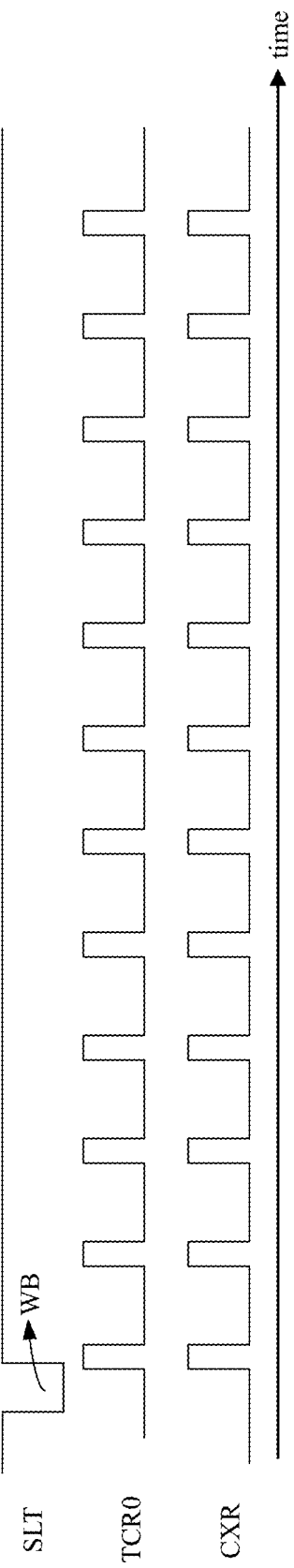
FIG. 4 is a timing diagram according to another embodiment of the present invention.

Reference is made to FIG. 4, which is a timing diagram according to another embodiment of the present invention. The timing diagram of FIG. 4 corresponds to the Bluetooth chip 120 operating according to the HFP. When the WLAN chip 110 learns from the Bluetooth chip information BT_Info that the Bluetooth chip 120 is operating according to the HFP, the WLAN chip 110 controls the slot allocation signal SLT to be at the high level except for the window WB indicative of the reception of a beacon (which is an equivalent of all slots being the slot BT except for the window WB). For the Bluetooth chip 120, the Bluetooth chip 120 can ignore this window WB (i.e., the entire slot allocation signal SLT is at the high level) because the Bluetooth chip 120, when operating according to the HFP, is very sensitive to sound signals (i.e., the human ear can easily hear small differences). As a result, the packet distribution signal CXR is identical to the packet transceiving request signal TCR0 (i.e., the Bluetooth chip 120 has a higher priority to use the antenna 105), whereas the WLAN chip 110 uses the antenna 105 when the packet distribution signal CXR is at the low level (i.e., when the Bluetooth chip 120 is not transmitting or receiving packets).

In an alternative embodiment, the Bluetooth chip 120 may take the window WB into account, that is, the Bluetooth chip 120 does not ignore the window WB.

In another alternative embodiment, the WLAN chip 110 may ignore the window WB, that is, the slot allocation signal SLT may be kept at the high level all the time.

In some embodiments, the WLAN chip 110 can learn the current operating profile of the Bluetooth chip 120 by analyzing the waveform of the packet distribution signal CXR (e.g., by counting the number of level transitions in a period of time). For example, the WLAN chip 110 determines that the Bluetooth chip 120 is operating according to the HFP when the counting result is greater than a predetermined value.

Figure 5:
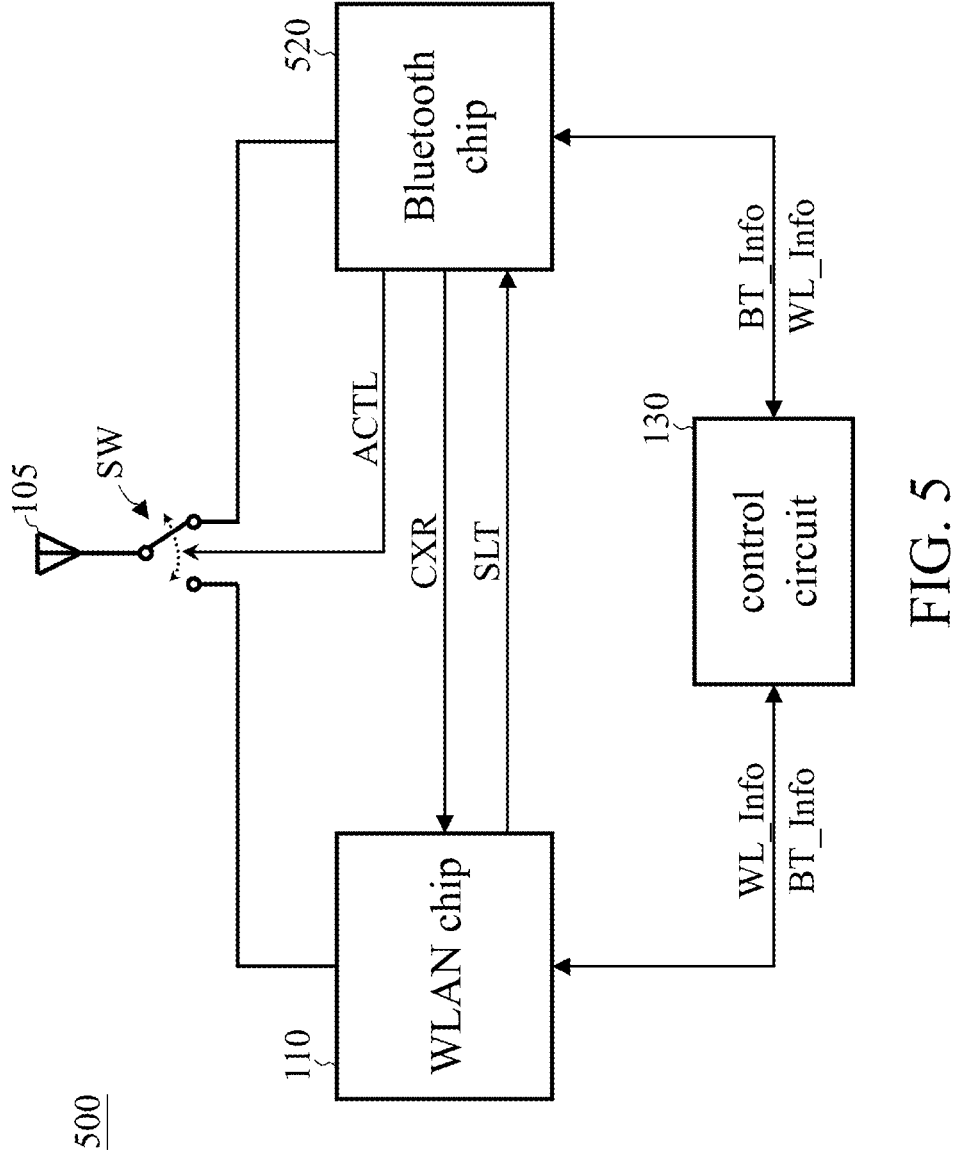
FIG. 5 is a functional block diagram of an electronic device according to another embodiment of the present invention.

FIG. 5 is a functional block diagram of the electronic device according to another embodiment of the present invention. The electronic device 500 includes the antenna 105, the line switching circuit SW, the WLAN chip 110, a Bluetooth chip 520, and the control circuit 130. The electronic device 500 is similar to the electronic device 100 except that the Bluetooth chip 520 controls the line switching circuit SW with the antenna control signal ACTL. In other words, the Bluetooth chip 520 has control over the antenna 105 (or the line switching circuit SW).

Figure 6:
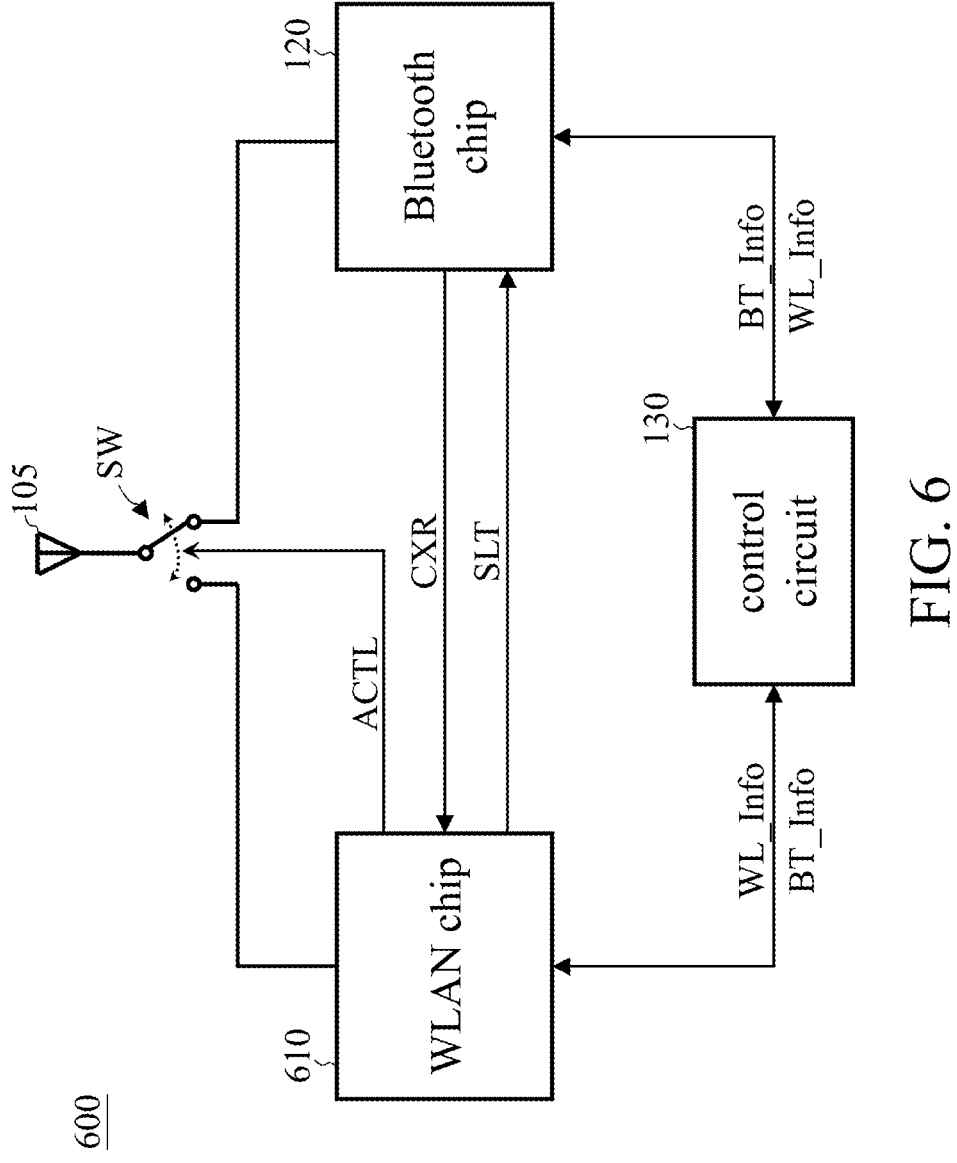
FIG. 6 is a functional block diagram of an electronic device according to another embodiment of the present invention.

FIG. 6 is a functional block diagram of the electronic device according to another embodiment of the present invention. The electronic device 600 includes the antenna 105, the line switching circuit SW, a WLAN chip 610, the Bluetooth chip 120, and the control circuit 130. The electronic device 600 is similar to the electronic device 100 except that the WLAN chip 610 controls the line switching circuit SW with the antenna control signal ACTL. In other words, the WLAN chip 610 has control over the antenna 105 (or the line switching circuit SW).

In some embodiments, the antenna control signal ACTL is identical to the packet distribution signal CXR; that is, the Bluetooth chip 520 and the WLAN chip 610 control the line switching circuit SW according to the packet distribution signal CXR.

Figure 7:
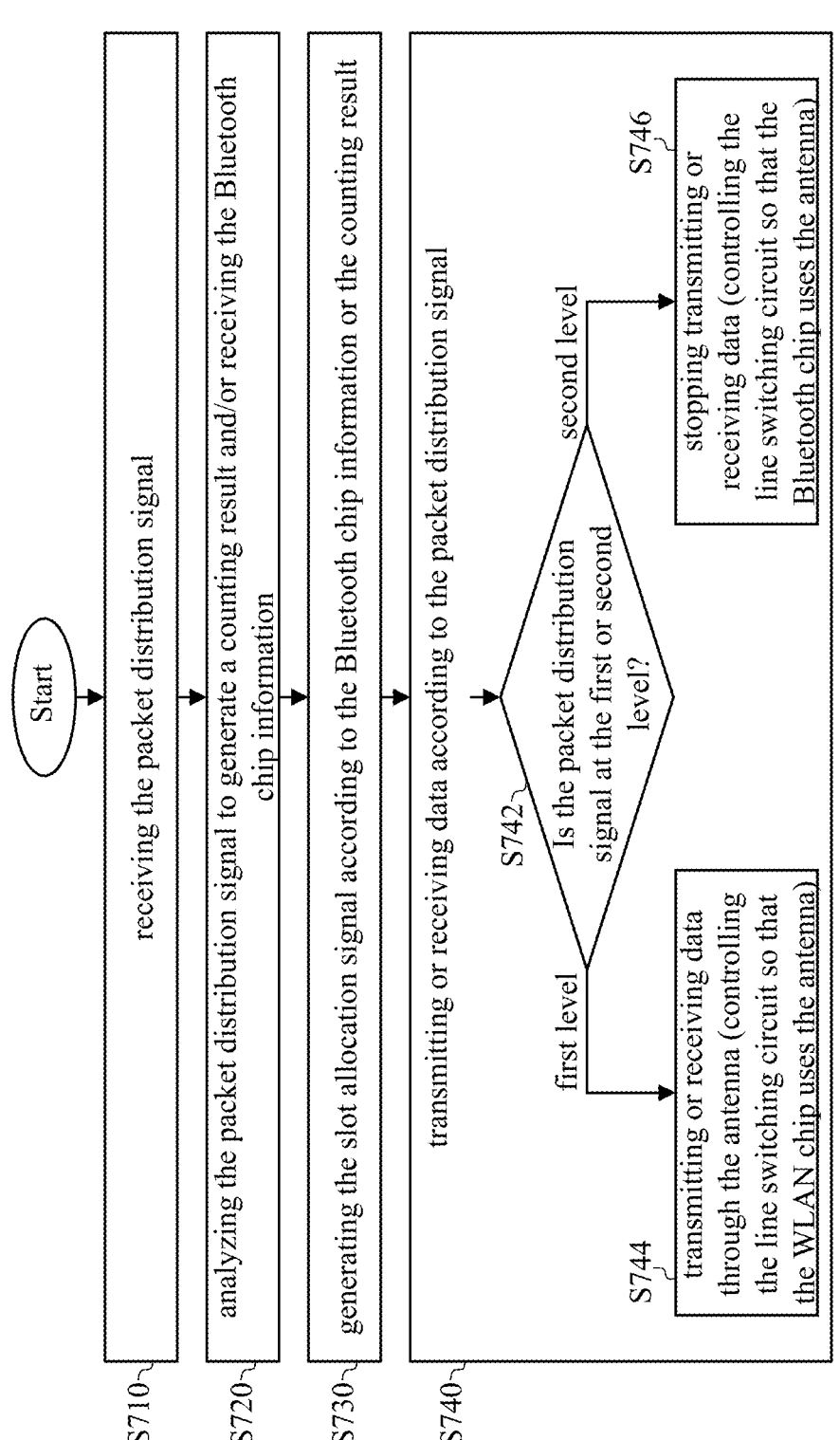
FIG. 7 is a flowchart of an operation method of a WLAN chip according to an embodiment of the present invention.

FIG. 7 is a flowchart of the operation method of the WLAN chip according to an embodiment of the present invention. The method includes the following steps.

Step S710: The WLAN chip 110 (or 610) receives the packet distribution signal CXR.

Step S720: The WLAN chip 110 (or 610) analyzes the packet distribution signal CXR to generate a counting result and/or receives the Bluetooth chip information BT_Info. In some embodiments, the counting result is the number of level transitions of the packet distribution signal CXR within a predetermined period of time. When the counting result is greater than a preset value, the WLAN chip 110 (or 610) determines that the current operating profile of the Bluetooth chip 120 (or 520) is the HFP.

Step S730: The WLAN chip 110 (or 610) generates the slot allocation signal SLT according to the Bluetooth chip information or the counting result, that is, determines the number of slots in a period T and/or the level of the slot allocation signal SLT.

Step S740: The WLAN chip 110 (or 610) transmits or receives data according to the packet distribution signal CXR. Step S740 includes sub-steps S742, S744 and S746.

Step S742: The WLAN chip 110 (or 610) determines whether the packet distribution signal CXR corresponds to the first level (e.g., the low level) or the second level (e.g., the high level). If the packet distribution signal CXR is at the first level, the WLAN chip 110 (or 610) performs step S744. If the packet distribution signal CXR is at the second level, the WLAN chip 110 (or 610) performs step S746.

Step S744: The WLAN chip 110 (or 610) transmits or receives data through the antenna 105. Because the WLAN chip 610 has control over the antenna 105 (or the line switching circuit SW), in this step, the WLAN chip 610 further controls the line switching circuit SW to electrically connect the antenna 105 to the WLAN chip 610 rather than the Bluetooth chip 120.

Step S746: The WLAN chip 110 (or 610) stops transmitting or receiving data. Because the WLAN chip 610 has control over the antenna 105 (or the line switching circuit SW), in this step, the WLAN chip 610 further controls the line switching circuit SW to electrically connect the antenna 105 to the Bluetooth chip 120 rather than the WLAN chip 610.

Figure 8A:
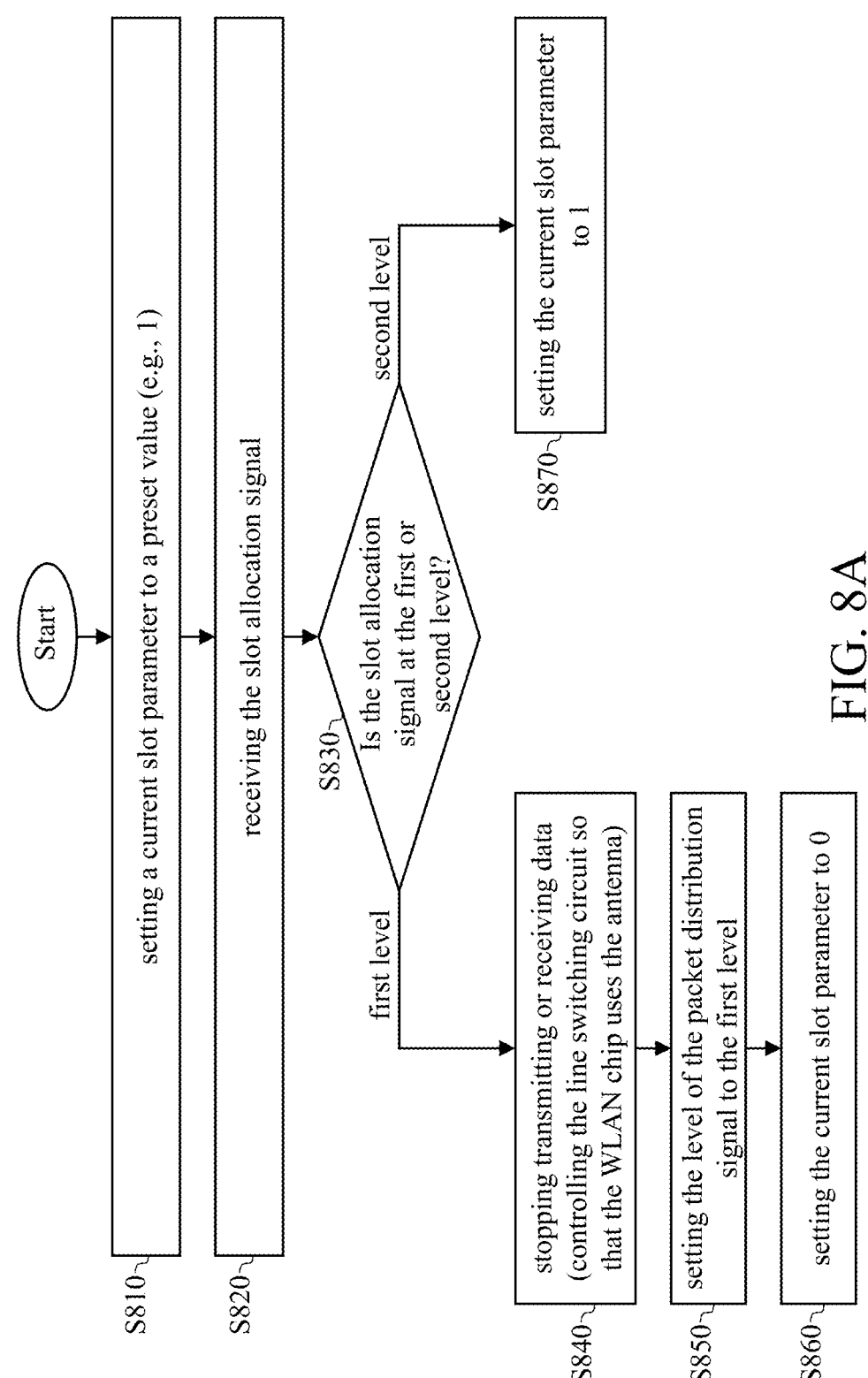
FIGS. 8A and 8B are flowcharts of an operation method of a Bluetooth chip according to an embodiment of the present invention.
Figure 8B:
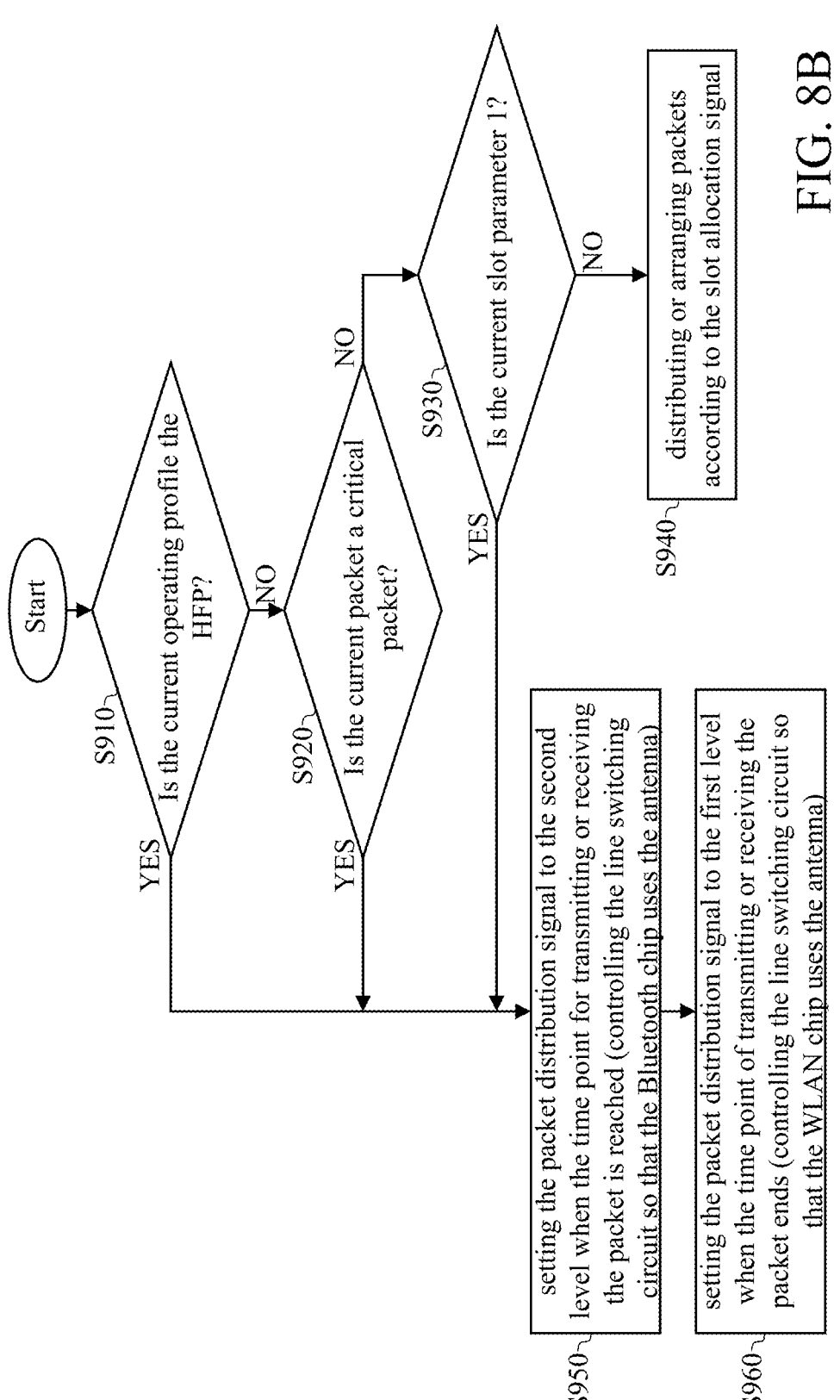

FIGS. 8A and 8B are flowcharts of the operation method of the Bluetooth chip according to an embodiment of the present invention. FIG. 8A is related to the overall operation of the Bluetooth chip 120 (or 520), and FIG. 8B is related to the operation of the Bluetooth chip 120 (or 520) when transmitting and/or receiving packets.

Reference is made to FIG. 8A for the following discussion.

Step S810: The Bluetooth chip 120 (or 520) sets a current slot parameter to a preset value (e.g., 1). The current slot parameter is indicative of the type of the current slot, that is, the slot WL (e.g., the current slot parameter being 0) or the slot BT (e.g., the current slot parameter being 1).

Step S820: The Bluetooth chip 120 (or 520) receives the slot allocation signal SLT.

Step S830: The Bluetooth chip 120 (or 520) determines whether the slot allocation signal SLT corresponds to the first level (e.g., the low level) or the second level (e.g., the high level). If the slot allocation signal SLT is at the first level, the Bluetooth chip 120 (or 520) performs steps S840 to S860. If the slot allocation signal SLT is at the second level, the Bluetooth chip 120 (or 520) performs step S870.

Step S840: The Bluetooth chip 120 (or 520) stops transmitting or receiving data. Because the Bluetooth chip 520 has control over the antenna 105 (or the line switching circuit SW), in this step, the Bluetooth chip 520 further controls the line switching circuit SW to electrically connect the antenna 105 to the WLAN chip 110 rather than the Bluetooth chip 520.

Step S850: The Bluetooth chip 120 (or 520) sets the level of the packet distribution signal CXR to a level identical to that of the slot allocation signal SLT (i.e., both are at the first level).

Step S860: The Bluetooth chip 120 (or 520) sets the current slot parameter to 0.

Step S870: The Bluetooth chip 120 (or 520) sets the current slot parameter to 1.

Reference is made to FIG. 8B for the following discussion.

Step S910: The Bluetooth chip 120 (or 520) determines whether the current operating profile is the HFP. If YES, then the Bluetooth chip 120 (or 520) performs steps S950 to S960; otherwise, the Bluetooth chip 120 (or 520) performs step S920.

Step S920: The Bluetooth chip 120 (or 520) determines whether the current packet is a critical packet (e.g., determines whether the packet to be transmitted or received is packet B or packet E in FIG. 2 and FIG. 3). If YES, then the Bluetooth chip 120 (or 520) performs steps S950 to S960; otherwise, the Bluetooth chip 120 (or 520) performs step S930.

Step S930: The Bluetooth chip 120 (or 520) determines whether the current slot parameter is 1. If YES, then the Bluetooth chip 120 (or 520) performs steps S950 to S960; otherwise, the Bluetooth chip 120 (or 520) performs step S940.

Step S940: The Bluetooth chip 120 (or 520) distributes or arranges packets according to the slot allocation signal SLT. For example, for the timing diagram of FIG. 2, this step may correspond to rearranging packets A and D in the slot WL to the next slot (the slot BT); for the timing diagram in FIG. 3, this step may correspond to rearranging packets A and C in the slot WL to the next slot (the slot BT).

Step S950: The Bluetooth chip 120 (or 520) sets the packet distribution signal CXR to the second level when the time point of transmitting or receiving a packet is reached. Because the Bluetooth chip 520 has control over the antenna 105 (or the line switching circuit SW), in this step, the Bluetooth chip 520 further controls the line switching circuit SW to electrically connect the antenna 105 to the Bluetooth chip 520 rather than the WLAN chip 110.

Step S960: The Bluetooth chip 120 (or 520) sets the packet distribution signal to the first level when the time point of transmitting or receiving the packet ends. Because the Bluetooth chip 520 has control over the antenna 105 (or the line switching circuit SW), in this step, the Bluetooth chip 520 further controls the line switching circuit SW to electrically connect the antenna 105 to the WLAN chip 110 rather than the Bluetooth chip 520.

Figure 9:
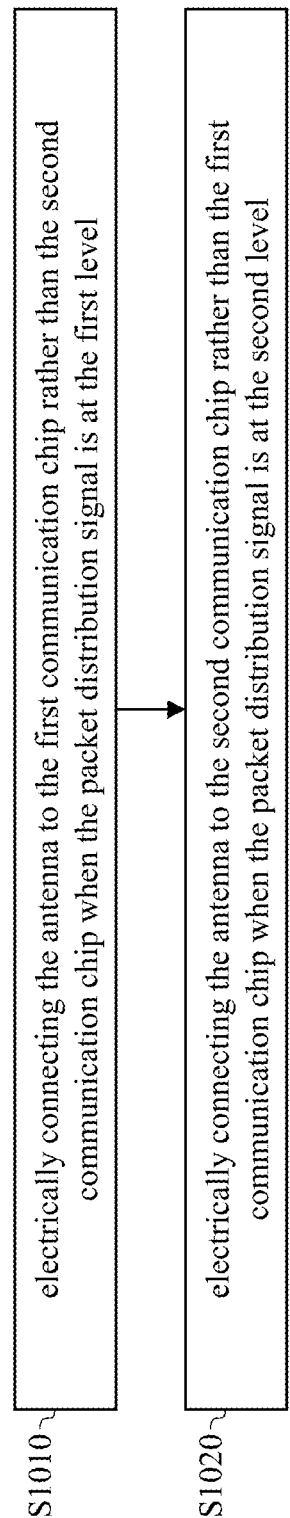
FIG. 9 is a flowchart of an antenna control method according to an embodiment of the present invention.

FIG. 9 is a flowchart of an antenna control method according to an embodiment of the present invention. The method includes the following steps.

Step S1010: When the packet distribution signal CXR corresponds to the first level (e.g., the low level), the Bluetooth chip 520 or the WLAN chip 610 electrically connects the antenna 105 to the first communication chip (e.g., the WLAN chip 110 or the WLAN chip 610) rather than the second communication chip (e.g., the Bluetooth chip 520 or the Bluetooth chip 120). In some embodiments, the first communication chip and the second communication chip are communication chips of different types.

Step S1020: When the packet distribution signal CXR corresponds to the second level (e.g., the high level), the Bluetooth chip 520 or the WLAN chip 610 electrically connects the antenna 105 to the second communication chip rather than the first communication chip.

In some embodiments, the WLAN chip 110, the WLAN chip 610, the Bluetooth chip 120, and the Bluetooth chip 520 are not coupled and electrically connected to other antennas except for the antenna 105.

In some embodiments, the control circuit 130 is a main control circuit of the electronic device 100, 500 or 600; for example, the control circuit 130 is a processor or microcontroller of a smart watch, a smart band, or a smart gateway. The control circuit 130 can be a circuit or an electronic component with program execution capability, such as a central processing unit, a microprocessor, a microprocessor unit, a digital signal processor (DSP), an Application Specific Integrated Circuit (ASIC), or an equivalent thereof. The control circuit 130 can implement the main functions of the electronic device 100, 500, or 600 by executing program codes and/or program instructions.

The above-mentioned first level and second level are for illustrative purposes only, not for limiting the scope of the present invention. People having ordinary skill in the art can replace the high/low level with low/high level based on the above discussions.

Although the above-disclosed embodiments take the WLAN as an example, this is not a limitation to the present invention. People having ordinary skill in the art can apply the present invention to other types of wireless communication protocols, such as Thread or Zigbee, according to the disclosure of the present invention.

Since a person having ordinary skill in the art can appreciate the implementation detail and the modification thereto of the present method invention through the disclosure of the device invention, repeated and redundant description is thus omitted. The shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An electronic device, comprising:
an antenna;
a line switching circuit coupled to the antenna;
a first communication chip coupled to the antenna through the line switching circuit and configured to generate a slot allocation signal; and
a second communication chip coupled to the antenna through the line switching circuit and configured to generate a packet distribution signal, wherein the first communication chip and the second communication chip are communication chips of different types;
wherein the line switching circuit switches the antenna to the first communication chip or the second communication chip according to the packet distribution signal.

2. The electronic device of claim 1, wherein the line switching circuit switches the antenna to the first communication chip when the packet distribution signal is at a first level and switches the antenna to the second communication chip when the packet distribution signal is at a second level, the first level being different from the second level.

3. The electronic device of claim 2, wherein the second communication chip transmits or receives a packet when the packet distribution signal is at the second level.

4. The electronic device of claim 2, wherein the slot allocation signal comprises a first slot and a second slot, and the second communication chip moves a packet that is originally scheduled in the first slot for transmission or reception to the second slot for transmission or reception, the second slot being later than the first slot.

5. The electronic device of claim 1, wherein the first communication chip generates the slot allocation signal according to a beacon reception time.

6. The electronic device of claim 1 further comprising:
a control circuit coupled to the first communication chip and the second communication chip and configured to transmit a current operating profile of the second communication chip to the first communication chip;
wherein the first communication chip generates the slot allocation signal according to the current operating profile.

7. The electronic device of claim 1, wherein the first communication chip and the second communication chip are not coupled and electrically connected to other antennas.

8. An antenna control method of switching an antenna to a first communication chip or a second communication chip, the first communication chip and the second communication chip being communication chips of different types, the first communication chip outputting a slot allocation signal to the second communication chip, and the second communication chip outputting a packet distribution signal, the method comprising:
electrically connecting the antenna to the first communication chip and not electrically connected the antenna to the second communication chip when the packet distribution signal is at a first level; and
electrically connecting the antenna to the second communication chip and not electrically connected the antenna to the first communication chip when the packet distribution signal is at a second level;
wherein the first level is different from the second level;
wherein the second communication chip generates the packet distribution signal according to the slot allocation signal.

9. The method of claim 8, wherein the packet distribution signal being at the first level is indicative of the second communication chip being not transmitting or receiving a packet, and the packet distribution signal being the second level is indicative of the second communication chip being transmitting or receiving the packet.

10. The method of claim 8, wherein the first communication chip is a wireless local area network (WLAN) chip, and the second communication chip is a Bluetooth chip.

11. A communication chip that shares an antenna with a target communication chip, one of the communication chip and the target communication chip switching the antenna to the communication chip when a packet distribution signal is at a first level, so that the communication chip can use the antenna and the target communication chip cannot use the antenna, one of the communication chip and the target communication chip switching the antenna to the target communication chip when the packet distribution signal is at a second level, so that the target communication chip can use the antenna and the communication chip cannot use the antenna, the first level being different from the second level, and the communication chip and the target communication chip being communication chips of different types, wherein the target communication chip generates a slot allocation signal according to a beacon reception time, and the communication chip generates the packet distribution signal according to the slot allocation signal.

12. The communication chip of claim 11, wherein the communication chip generates the packet distribution signal.

13. The communication chip of claim 11, wherein the slot allocation signal comprises a first slot and a second slot, the communication chip moves a packet that is originally scheduled in the first slot for transmission or reception to the second slot for transmission or reception, and the second slot is later than the first slot.

14. The communication chip of claim 11, wherein the target communication chip generates the slot allocation signal according to a current operating profile of the communication chip.

15. The communication chip of claim 12, wherein the target communication chip is a wireless local area network (WLAN) chip, and the communication chip is a Bluetooth chip.

16. The electronic device of claim 1, wherein the second communication chip generates the packet distribution signal according to the slot allocation signal.

* * * * *